United States Patent [19]

Horii

[11] Patent Number: 5,304,025
[45] Date of Patent: Apr. 19, 1994

[54] SECTION FEEDER FOR BOOK BINDING MACHINE

[75] Inventor: Yoshiyuki Horii, Kyoto, Japan

[73] Assignee: Horizon International Inc., Shiga, Japan

[21] Appl. No.: 61,216

[22] Filed: May 13, 1993

[30] Foreign Application Priority Data

May 18, 1992 [JP] Japan ................... 4-169827

[51] Int. Cl.$^5$ .................. B42B 9/00; B42C 1/12; B65G 49/00
[52] U.S. Cl. ........................ 412/9; 412/13; 198/644; 271/184; 271/225
[58] Field of Search .............. 412/9, 13, 18; 198/372, 198/486.01, 486.6, 570, 644; 270/53, 54; 271/69, 184, 225, 306

[56] References Cited

U.S. PATENT DOCUMENTS

| | | | |
|---|---|---|---|
| 2,766,870 | 10/1956 | Baker et al. | 198/644 X |
| 2,984,330 | 5/1961 | Billeter | 198/457 |
| 3,155,220 | 11/1964 | Thorp | 198/463.6 |
| 3,701,176 | 10/1972 | Procter et al. | 412/9 X |
| 4,386,768 | 6/1983 | Zugel | 270/53 |
| 4,524,857 | 6/1985 | Rathert et al. | 271/225 X |
| 4,564,186 | 1/1986 | Clarke, Jr. et al. | 270/54 |
| 4,684,116 | 8/1987 | Hänsch | 198/644 |

FOREIGN PATENT DOCUMENTS

0194461 9/1986 European Pat. Off. .
3336397 5/1984 Fed. Rep. of Germany .
61-17725 6/1986 Japan .

OTHER PUBLICATIONS

English language translation of Abstract for Japanese Patent No. 17725 of 1986 (Tsukada), pp. 1-6.

*Primary Examiner*—Mark Rosenbaum
*Assistant Examiner*—S. Thomas Hughes
*Attorney, Agent, or Firm*—Morgan & Finnegan

[57] ABSTRACT

A section feeder for a book binding machine is provided with a pair of parallel guide plates (11A), (11B) attached to a base (10) in order to form a section conveying path therebetween, the section conveying path extending from a section supply station to a section delivery station, parallel guide slits (12A), (12B) formed on the guide plates, an elevating rod (14A), (14B) horizontally extending from the outside of each guide plate into the section conveying path through each guide slit (12A), (12B), the elevating rods associated with the same guide plate being movable all at once in such a manner that they reciprocate along said guide slits and enter into the section conveying path upon reaching the section supply station and retreat from the section conveying path upon reaching the section delivery station, the elevating rods associated with the different guide plates alternately moving upwardly and downwardly, whereby sections are lifted without tilting by a flat section support surface formed on the elevating rods from the section supply station to the section delivery station.

8 Claims, 7 Drawing Sheets

SECTION FEEDER FOR BOOK BINDING MACHINE

BACKGROUND OF THE INVENTION

This invention relates to a section feeder for a book binding machine, namely, an apparatus for feeding gathered sections from a collator to a book production line of a book binding machine.

In a conventional automatic book binding machine, a plurality of clamps are continuously moved on a book production line. Then gathered sections from a collator are clampingly held by the clamps and conveyed on the book production line along which a spine processing unit, a gluing unit and a cover application unit and so forth are arranged.

At the beginning of a book binding process, it is necessary to successively feed the sections from a collator to the book production line so that they are clampingly held by the clamps. Conventionally, because of a structure of the clamp, the section is lifted up from a section supply station below the clamp's travelling path to a section delivery station on the clamp's travelling path, and then the sections are clamped by the clamps having arrived at the section delivery station.

In order to achieve such lifting operation of the sections, it has been proposed to dispose an endless chain between the section supply station and the section delivery station in order to form an inclined path for conveying the sections. In this construction, the sections are conveyed by the chain from the section supply station to the section delivery station. However, while the sections are conveyed by the chain, the position of the sections are suddenly changed due to large bending of the section conveying direction at the time of the sections putting on the chain and at the time of the sections betting down the chain after elevation. Consequently, there is a possibility that the alignment of sections is disturbed. This problem can be solved by diminishing an angle of inclination of the chain, but it is not desirable because of enlargement of apparatus size.

In order to solve this problem, there has been proposed an apparatus for feeding sections gathered by a collator to a book binding machine without tilting the sections during feed operation of the sections (Japanese Patent Publication No. 17725 of 1986). In this apparatus, sections are conveyed by pushing pins, which are guided in an endless loop. from a collator to a section supply station along a horizontal travelling path. Furthermore, a plurality of endless chains are arranged in parallel with one another between the section supply station and the section delivery station. And a plurality of pins for supporting the sections are attached to each of the chains. Then the sections are lifted to the section delivery station by engagement of its spine with the pins without tilting.

However, in such apparatus, it is considerably troublesome to adjust the section lifting mechanism in such a manner that the associated pins of the chains engage with the spine of the section all at once. Especially, such adjustment becomes further difficult because the chains tend to wave during rotation. If the pins of the chains fail to engage with the spine of the section all at once, the section may tilt on the pins and slip down from the pins.

According to this apparatus, the level of the section delivery station cannot be adjusted. But the cut length of the spine is not always constant and it is necessary to adjust the level of the section delivery station by further travelling the section on an alignment plate after lifting the section to the section delivery station. In order to achieve this, there should be provided an additional space (corresponding to at least one clamp) for travel of the section on the alignment plate, which leads to a large-sized book binding machine.

SUMMARY OF THE INVENTION

It is the object of the present invention to feed sections without tilting from a collator to a book production line of a book binding machine.

It is another object of the present invention to efficiently feed sections to a book production line of a book binding machine.

It is further object of the present invention to eliminate the need of height adjustment of sections after conveying the sections to the section delivery station.

According to the present invention there is provided a section feeder for a book binding machine provided with a book production line on which a number of clamps are continuously moved, said section feeder being adapted for successively receiving sections from a collator at a section supply station positioned below said book production line and conveying said sections from said section supply station to a section delivery station positioned downstream from said section supply station on said book production line, and supplying said sections to the clamps having arrived at said section delivery station, said section feeder comprising: a pair of guide plates attached substantially perpendicular to a base and arranged in parallel with each other at a spacing corresponding to the thickness of the sections in order to form a section conveying path within said spacing, said section conveying path extending from said section supply station to said section delivery station; a plurality of parallel guide slits formed on at least one of said guide plates, said plurality of parallel guide slits slantingly extending from said section supply station to said section delivery station, the lower end of said each guide slit being at the same or the lower level of said section supply station and the upper end of said each guide slit being at the same or the upper level of said section delivery station; an elevating rod horizontally extending from the outside of said at least one of said guide plates into said section conveying path through said each guide slit and being guided for upward and downward movement along said guide slit; drive means for reciprocating said elevating rods all at once along said guide slits in such a manner that said sections are successively lifted without tilting by a flat section support surface formed on said elevating rods from said section supply station to said section delivery station.

In accordance with a preferred embodiment of the invention, a plurality of receiving shafts horizontally extending between said pair of guide plates are horizontally spaced in order to form said section supply station thereon.

In accordance with another preferred embodiment of the invention, said drive means for reciprocating said elevating rods all at once comprises an actuating block arranged outside said at least one of said guide plates for upward and downward movement in a direction parallel with said guide slits and wherein said elevating rods are attached to said actuating block at one end thereof and horizontally extend from said actuating block toward said section conveying path.

In accordance with further preferred embodiment of the invention, said section feeder comprises means for controlling the upper limit of the movement of said elevating rods within said guide slits in order to adjust a level of said section delivery station.

Furthermore, according to the present invention there is also provided a section feeder for a book binding machine provided with a book production line on which a number of clamps are continuously moved, said section feeder being adapted for successively receiving sections from a collator at a section supply station positioned below said book production line and conveying said sections from said section supply station to a section delivery station positioned downstream from said section supply station on said book production line, and supplying said sections to the clamps having arrived at said section delivery station, said section feeder comprising: a pair of guide plates attached substantially perpendicular to a base and arranged in parallel with each other at a spacing corresponding to the thickness of the sections so that a section conveying path is formed within said spacing, said section conveying path extending from said section supply station to said section delivery station; a plurality of parallel guide slits formed on said each guide plate, said plurality of parallel guide slits slantingly extending from said section supply station to said section delivery station, the lower end of said guide slit being at the same or the lower level of said section supply station and the upper end of said guide slit being at the same or the upper level of said section delivery station; an elevating rod horizontally extending from the outside of said each guide plate into said section conveying path through said each guide slit, said elevating rod being guided for upward and downward movement along said guide slit as well as forward and backward movement along its axis; drive means for moving said elevating rods associated with the same guide plate all at once in such a manner that said elevating rods reciprocate along said guide slits and enter into said section conveying path upon reaching said section supply station and retreat from said section conveying path upon reaching said section delivery station, and alternately moving upwardly and downwardly said elevating rods associated with the different guide plates, whereby said sections are successively lifted without tilting by a flat section support surface formed on said elevating rods from said section supply station to said section delivery station.

In accordance with a preferred embodiment of the invention, a plurality of receiving shafts horizontally extending between said pair of guide plates are horizontally spaced in order to form said section supply station thereon.

In accordance with another preferred embodiment of the invention, said drive means for reciprocating said elevating rods comprises an actuating block arranged outside said each guide plate for upward and downward movement in a direction parallel with said guide slits as well as forward and backward movement with respect to said guide plate and wherein said elevating rods attached to said guide plate at one ends thereof and horizontally extend from said actuating block to said section conveying path.

In accordance with further preferred embodiment of the invention, said section feeder comprises means for controlling the upper limit of the movement of said elevating rods within said guide slits in order to adjust a level of said section delivery station.

Accordingly, the present invention is advantageous in that the sections can be conveyed without tilting from a collator to a book production line of a book binding machine.

In addition, it is not necessary to provide an alignment plate for height adjustment of sections conveyed to a delivery station. Then the compact book binding machine can be provided.

BRIEF DESCRIPTION OF DRAWINGS

The other objects and features of this invention will become understood from the following description with reference to the accompanying drawings in which.

DETAILED DESCRIPTION OF THE PREFERRED EMBODIMENTS

Figure 4:
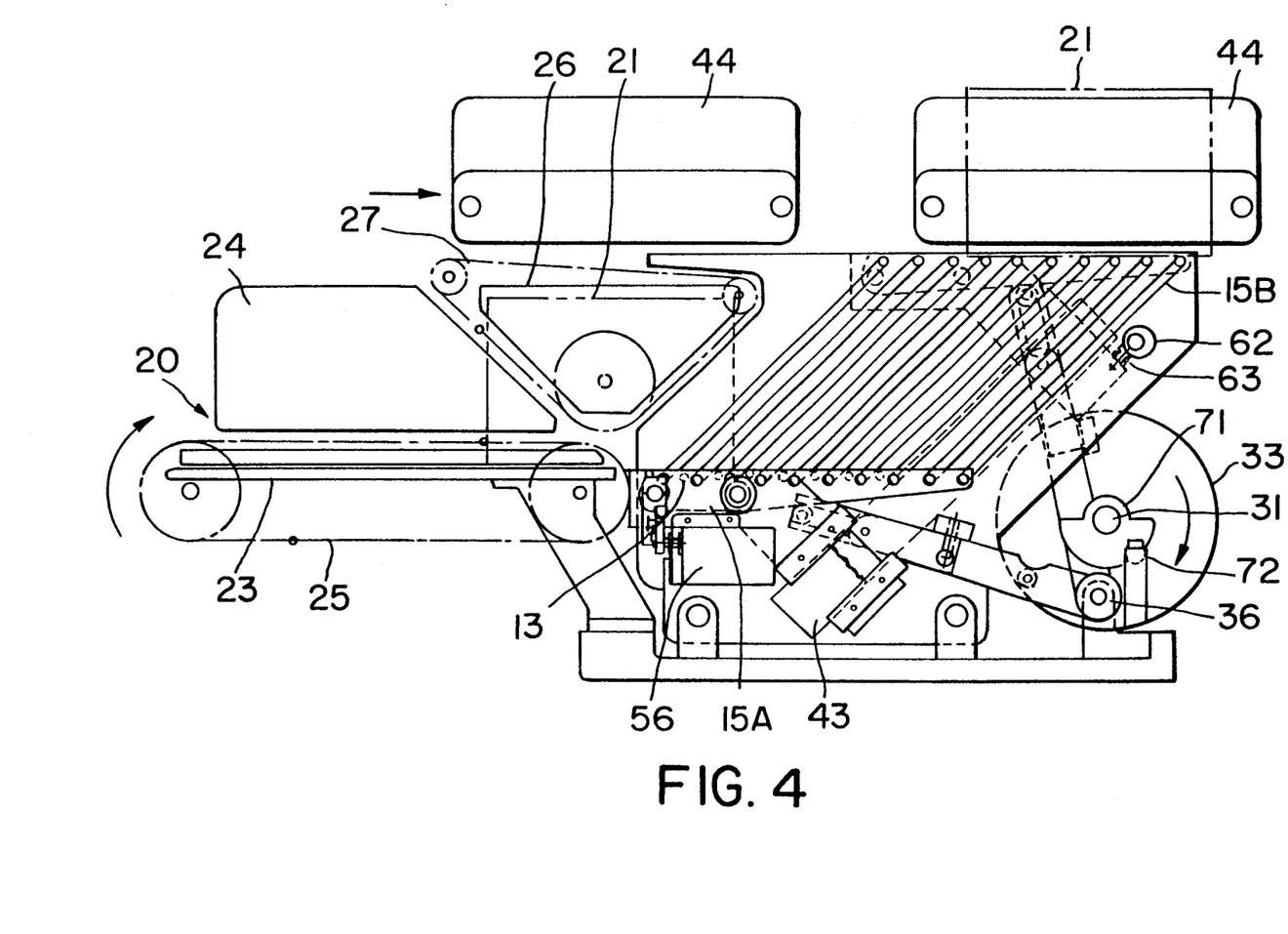
FIG. 4 is a front view of the section feeder shown in FIG. 3.
Figure 5:
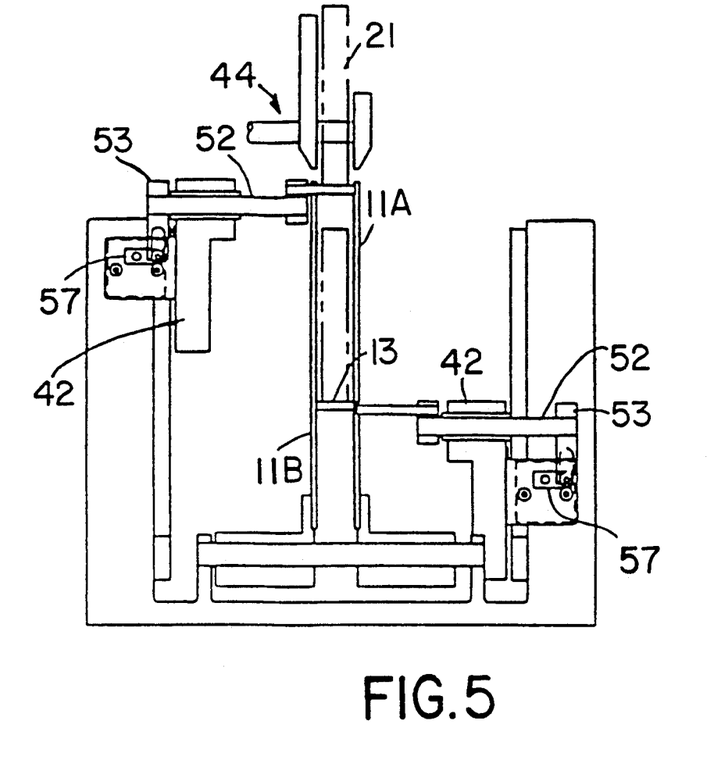
FIG. 5 is a side view of the section feeder shown in FIG. 3.

A book binding machine equipped with one embodiment of a section feeder in accordance with the present invention comprises a book production line on which a plurality of clamps are continuously moved with sections clampingly held thereby. Furthermore, a spine processing unit, a gluing unit and a cover application unit and so forth are arranged along the book production line. In FIG. 4, two clamps (44) travelling along an arrow schematically represent the book production line.

The section feeder according to the present invention is adapted for successively receiving sections from a collator at a section supply station below the book production line and conveying the sections from the section supply station to a section delivery station positioned downstream from the section supply station on the book production line, and supplying the sections to the clamps at the section delivery station.

Figure 1:
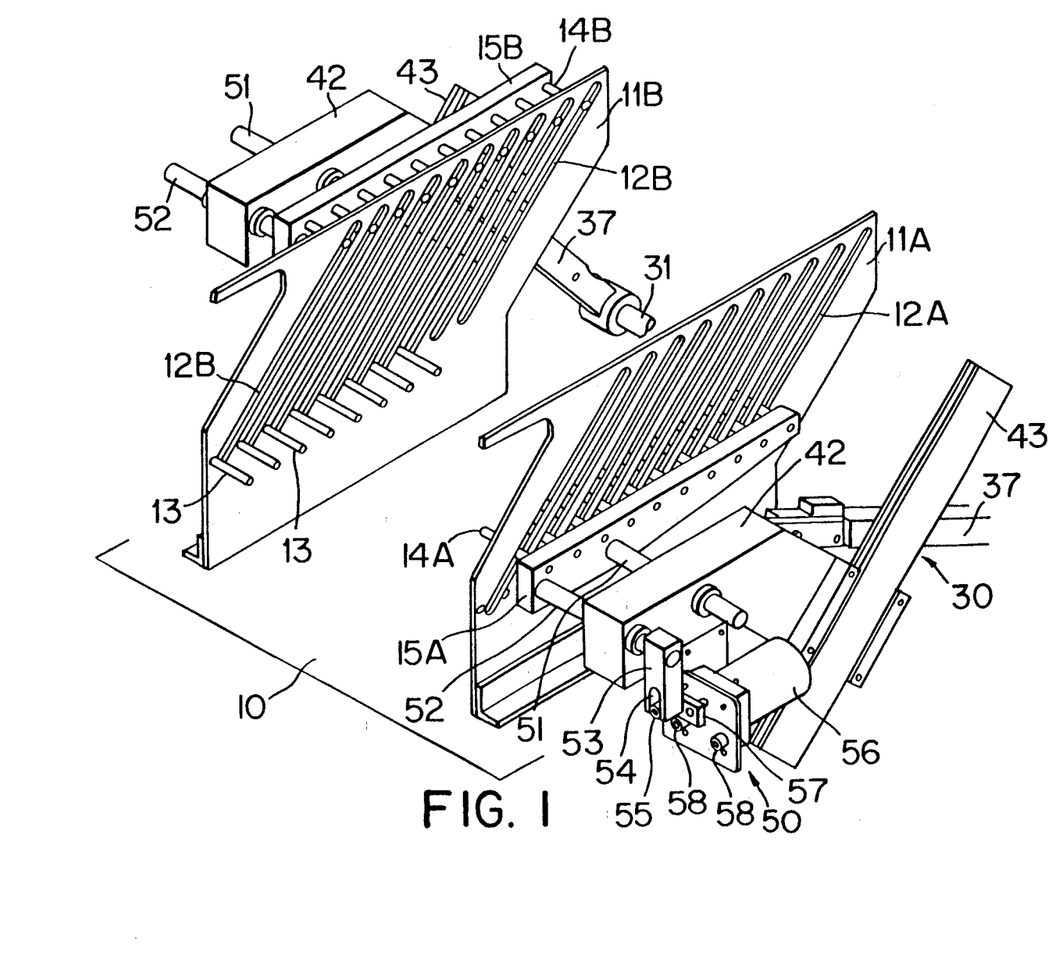
FIG. 1 is a perspective view showing the principal part of a section feeder for a book binding machine according to this invention.

FIG. 1 is an exploded view of the principal part of one embodiment of the section feeder for the book binding machine in accordance with the present invention. In FIG. 1, the numerals (11A), (11B) designate a pair of guide plates fixed perpendicular to a base (10) and arranged in parallel with each other at a spacing corresponding to the thickness of the section supplied from the collator. Then the spacing between the pair of guide plates forms a section conveying path from the section supply station to the section delivery station. Each of the guide plates (11A), (11B) is provided with a plurality of guide slits (12A), (12B) arranged in parallel with one another and extending obliquely from the section supply station to the section delivery station. The plurality of guide slits (12A), (12B) have their lower ends at the lower level of the section supply station and their upper ends at the upper level of the section delivery station. At the bottom of the guide plates (11A), (11B), a plurality of receiving shafts (13) horizontally extend between the guide plates (11A), (11B) are horizontally spaced and attached to the associated guide plates at their ends. The upper surfaces of the receiving shafts (13) forms the section supply station on which the section supplied from the collator is placed at its spine.

An elevating rod (14A) horizontally extends from the outside of the guide plate (11A) into the section conveying path through each of the guide slits (12A). And an elevating rod (14B) horizontally extends from the outside of the guide plate (11B) into the section conveying path through each of the guide slits (12B). The elevating rods (14A), (14B) have the length substantially corresponding to the spacing between the guide plates (11A), (11B). The actuating block (15A(15B)) is arranged outside the guide plate (11A(11B)) for upward and downward movement in a direction parallel with the guide slits (12A(12B)) as well as forward and backward movement with respect to the guide plate (11A(11B)). Then the elevating rods (14A(14B)) are attached to the actuating block (15A(15B)) at one ends thereof and horizontally extend from the actuating block (15A(15B)) to the section conveying path. Thus the elevating rods associated with the same guide plate are moved all at once in such a manner that they reciprocate along the guide slits and enter into the section conveying path upon reaching the section supply station and retreat from the section conveying path upon reaching the section delivery station, and alternately move upwardly and downwardly the elevating rods associated with the different guide plates.

The numeral (30) designates a mechanism for moving the actuating blocks (15A(15B)) upwardly and downwardly. The numeral (31) designates a drive shaft rotating at a predetermined speed. A pair of cam wheels (33), (34) are mounted on the drive shaft (31). The cam wheels (33), (34) are provided with cam grooves (32) whose phases are inverse to each other. Thus the cam wheels (33), (34) are rotated by the drive shaft (31).

The numeral (35) designates cam followers for tracing the cam grooves (32). The cam followers (35) are supported by arms (37) arranged for swing about arm shafts (36) thereof. U-shaped members (38) are attached to tip portions of the arms (37) through pins (39). The U-shaped members (38) are biased by springs (40) clockwise about the pins (39). Cam followers (41) are attached to the sliders (42) for tracing the U-shaped members (38). The numeral (43) designates rails fixed to the base. The rails (43) are slanted at the same angel as the guide slits (12A) of the guide plates. The sliders (42) are mounted on each of the rails (43) for slide movement along it.

When the cam wheels (33), (34) are rotated by the drive shaft (31), the arms (37) swing opposedly to each other and the sliders (42) alternately move upwardly and downwardly along the associated rails (43). Then the elevating rods associated with the different guide plates alternately move upwardly and downwardly along the associated guide slits.

Figure 6:
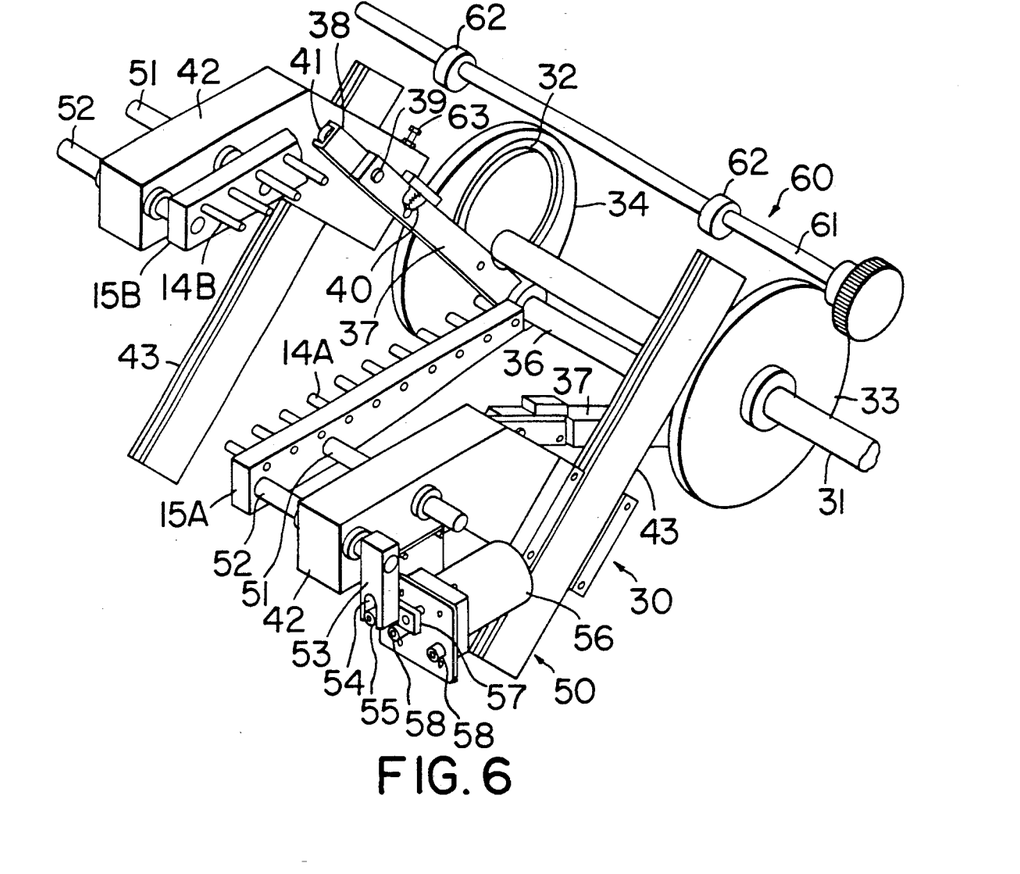
FIG. 6 is a perspective view of the section feeder shown in FIG. 3.
Figure 7:
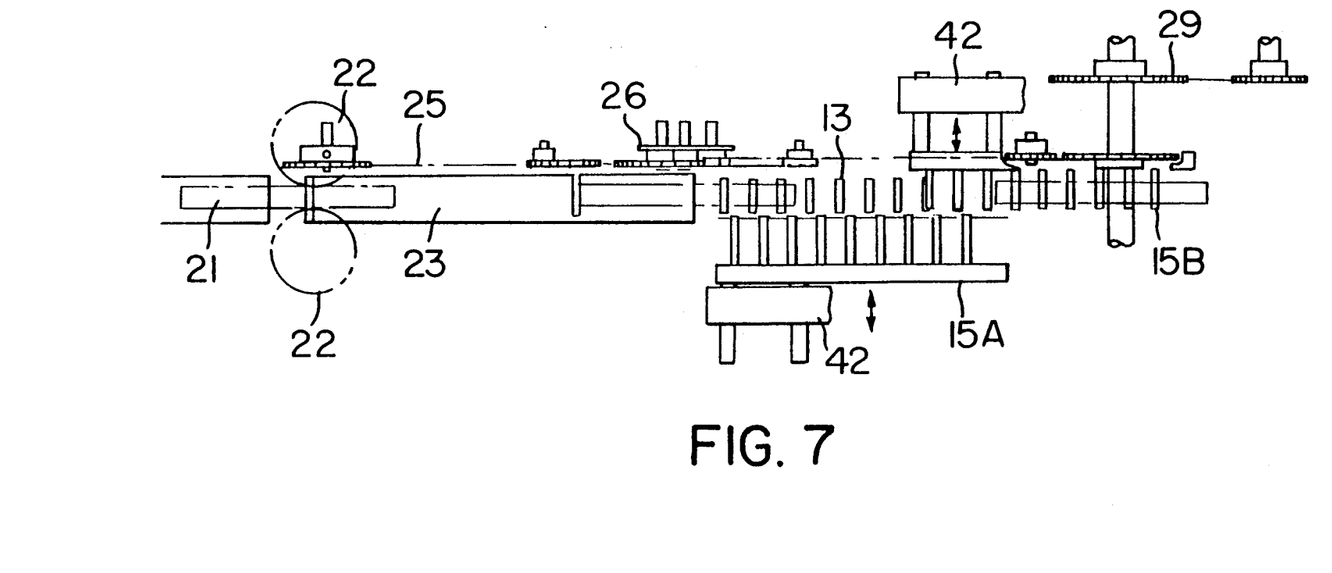
FIG. 7 is a plan view of the section feeder shown in FIG. 3.
Figure 8:
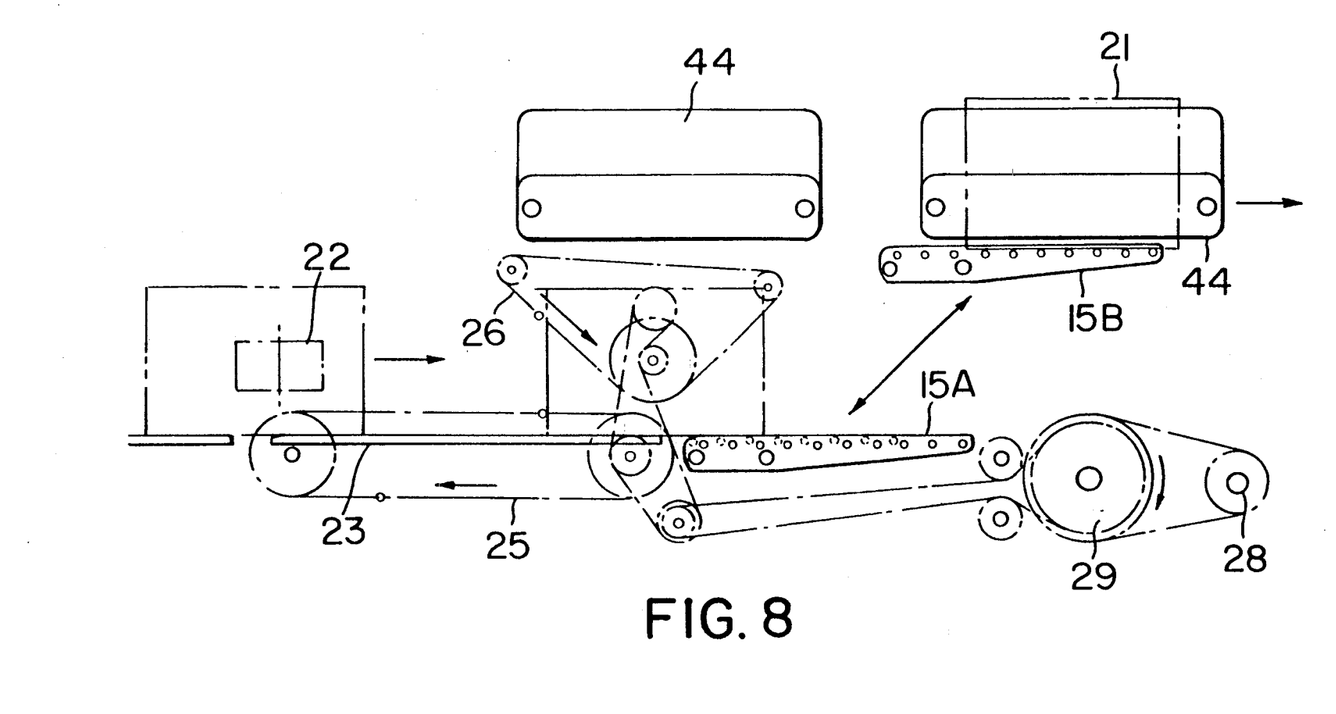
FIG. 8 is a front view of the section feeder shown in FIG. 4.

The numeral (50) designates a drive mechanism for moving the actuating block (15A(15B)) forward and backward movement with respect to the guide plate (11A(11B)). As shown in FIG. 6, the actuating block (15A) is connected with the slider (42) through both a guide shaft (51) and an actuating shaft (52) one ends of which are fixed to the actuating block (15A) and the other ends of which outwardly extend through the slider (42).

An arm (53) is mounted on a front end of the actuating shaft (52). The arm (53) is provided with U-shaped groove 54 in which a follower (55) is fitted. The follower (55) is supported on a front end of an arm (57) rotated by a motor (56). The motor (56) is attached to the slider (42) so that it together with the slider (42) moves upwardly and downwardly along the rail (43). The numeral (58) designates a stopper for controlling rotation of the arm (57).

Referring to FIGS. 3-8, the numeral (20) designates a mechanism for supplying sections from a collator between the pair of guide plates (11A), (11B). First, a section (21) is fed by feed rollers 22 on an equalizing plate (23) in order to true up the edges of its spine.

The section on the equalizing plate (23) is supported between guide plates (24). Then the section is conveyed by a circulating endless chain (25) with hooks between the pair of guide plates (11A), (11B). In FIG. 4, the guide plates (24) are separated into the upper part and the lower part which are connected to each other through a U-shaped member in order to form a space for movement of the chain (25) between the upper and lower parts.

Then the section is transferred from a path between the guide plates (24) to a path between guide plates (26) and conveyed by a circulating endless chain (27) with hooks between the guide plates (26) to a position above the receiving shafts (13). The chain (27) with hooks forms a triangular conveyor path.

Then the chain (27) pushes down the upper portion of the section's rear end in a slantingly direction so as to a tip of the section is placed on the receiving shaft (13), that is, the section supply station and thereafter the chain (27) pushes up the lower portion of the section's rear end in a slantingly direction. Thus the sections are successively supplied from the collator to the section supply station. The guide plates (26) are integrated with the guide plates (24) and the chains (25) and (27) are driven by chain wheels (29) rotated by a motor (28).

In FIG. 6, when the actuating block (15A) together with the elevating rods (14A) reach the section delivery station, the motor (56) synchronously is activated. Then the arm (57) is rotated clockwise so as to backwardly move the actuating shaft (52) through the follower (55) and the arm (53). Consequently, the actuating block (15A) are backwardly moved and the elevating rods (14A) outwardly retreat from the section conveying path through the guide slits (12A).

When the actuating block (15A) together with the elevating rods (14A) reach the section supply station, the arm (57) is rotated counterclockwise in order to forwardly move the actuating shaft (52), which causes the elevating rods (14A) to enter the section conveying path through the guide slits (12A). For simplicity, in FIGS. 1 and 6, only the drive mechanism (50) for the elevating rods (15A) is shown.

The numeral (60) designates mechanisms for controlling the upper limit of the movement of the elevating rods (14A), (14B) within the guide slits (12A), (12B) in order to adjust a level of the section delivery station. The sections clampingly held the clamps are cut at spines thereof by the spine processing unit in the book production line, but the same length of the spines are not always cut out. Therefore, it is necessary to adjust the level of the section delivery station, that is, the upper limit of the movement of the elevating rods (14A), (14B).

The mechanism (60) comprises a shaft (61) manually rotatable about its axis, a cam (62) mounted on the shaft (61) and a stopper (63) attached to the slider (42) for engagement with the cam (62). The upward movement of the slider (42) is stopped by the engagement of the stopper (63) with the cam (62).

In this case, further lifting force is affected to the slider (42), the U-shaped member (38) is rotated about the pin (39) with respect to the arm (37) against the resilient force of the spring (40) in order to absorb the lifting force. Consequently, the slider (42) cannot be moved upwardly. The upper limit of the movement of the elevating rods (14A) can be controlled by rotating the cam (62) through the shaft (61) so that the level of the section delivery station can be easily adjusted.

Thus there is no need of adjusting the level of the sections through the alignment plate after conveying the sections to the section delivery station. Therefore, it is not necessary to provide the alignment plate, so that the travel distance of the clamps is diminished because of elimination of unnecessary movement of the clamps, which leads to a compact book binding machine.

In FIG. 4, the drive shaft (31) is provided with a semicircle plate (71) and a sensor (72) for detecting the periphery of the plate (71) in order to detect when the elevating rods reach the section supply station or the section delivery station. When the sensor (72) detects the arrival of the elevating rods at the section supply station or the section delivery station, the motor (56) starts rotating so as to move the elevating rods forwardly and backwardly.

Prior to supply the sections from the collator to the section supply station, the actuating block (15A) moves forwardly so that the elevating rods (14A) enter the section conveying path through the guide slits (12A). At this time, the elevating rods (14A) are positioned at the same level or the lower level of the receiving shafts (13). On the other hand, the actuating block (15B) moves backwardly to retreat the elevating rods (14B) from the section conveying path. This operation state is illustrated in FIG. 1. This operation state is a stand-by state, referred as a first operation state.

In the first state or prior to the first state, the sections are successively conveyed from the collator through the section conveying path to the section supply station, where the sections are supported on the receiving shafts (13), that is, the section supply station at spines thereof. Thereafter, the actuating block (15A) starts upwardly moving in parallel with the guide slits so that the elevating rods (14A) lift the section without tilting by a flat section support surface formed on the rods from the section supply station to the section delivery station.

When the section is conveyed to the section delivery station, the clamp also reaches the section delivery station, where the section is inserted into the clamp and clamped by the clamp. The section clampingly held by the clamp is conveyed to a first processing position on the book production line.

While the elevating rods (14A) upwardly moves from the first operation state to the section delivery station, the actuating block (15B) and hence the elevating rods (14B) downwardly move to the section supply station. An operation state in which the elevating rods (14B) reach the section supply station and the elevating rods (14A) reach the section delivery station is referred as a second operation state.

After the elevating rods (14A) deliver the section to the clamp at the section delivery station, the actuating block (15A) backwardly moves so that the elevating rods (14A) retreat from the section conveying path through the guide slits (12A), while the actuating block (15B) forwardly moves so that the elevating rods (15A) enter the section conveying path. This operation state is referred as a third operation state. The third operation state corresponds to the position relationship between two sets of elevating rods reversed in the first operation state.

Until or after the apparatus reaches the third operation state, the next section is supplied from the collator to the section supply station. Thereafter, the actuating block (15B) upwardly moves so that the elevating rods (14B) upwardly move along the guide slits (12B). Then the elevating rods (14B) receive the section from the receiving shafts (13) at a flat section support surface formed thereon and lift them without tilting to the section delivery station. When the section is conveyed to the section delivery station, the clamp also reaches the section delivery station, where the section is clampingly held by the clamp and conveyed to a first processing position on the book production line.

While the actuating block (15B) upwardly moves from the third operation state to the section delivery station, the actuating block (15A) and hence the elevating rods (14A) downwardly move to the section supply station along the guide slits (12A). An operation state in which the elevating rods (14B) reach the section delivery station and the elevating rods (14A) reach the section supply station is referred as a fourth operation state.

After the section is delivered from the elevating rods (14B) to the clamp, the actuating block (15B) backwardly moves so that the elevating rods (14B) retreat from the section conveying path and the actuating block (15A) forwardly moves. Thus the apparatus returns to the first operation state.

Figure 2:
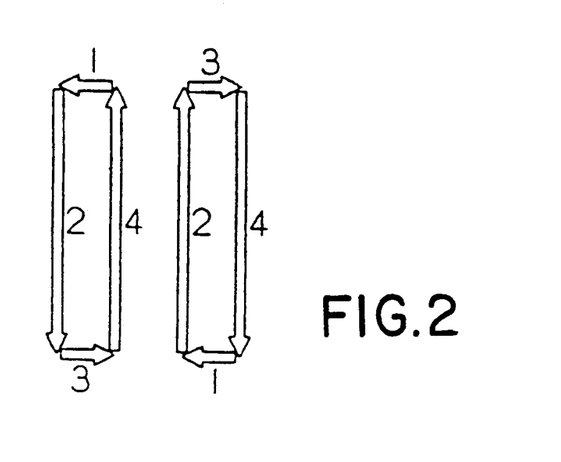
FIG. 2 is a timing chart of elevating rods shown in FIG. 1.
Figure 3:
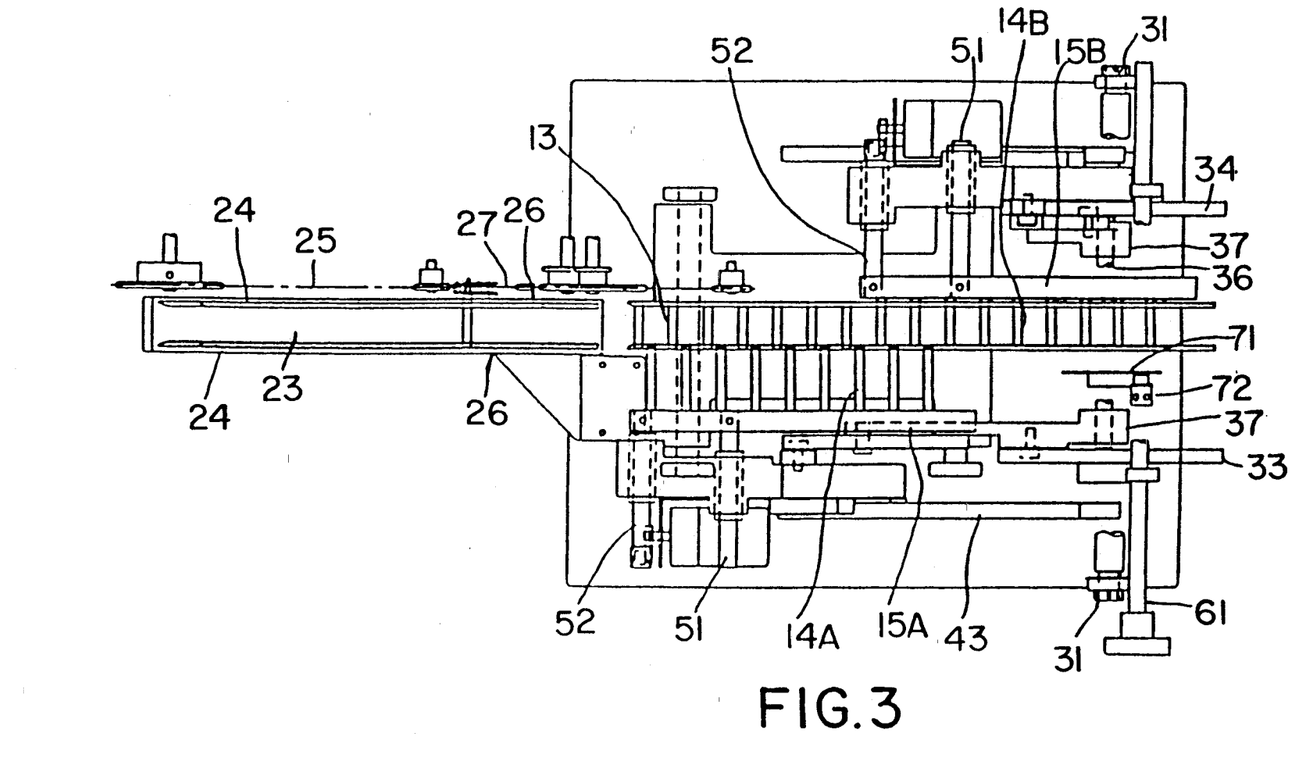
FIG. 3 is a plan view of the section feeder for a book binding machine according to this invention.

Thus a set of the elevating rods (14A) and a set of the elevating rods (14B) alternately perform the upward and downward movement, so that the sections are successively conveyed from the section supply station to the section delivery station. The timing of operation of each set of the elevating rods is shown in FIG. 2.

In the embodiment above described, the elevating rods associated with the different guide plates are alternately moved upwardly and downwardly. Therefore two sections can be conveyed during one reciprocal movement of each set of the elevating rods and the number of sections conveyed within a given period becomes twice as many as that of the apparatus with only one set of the elevating rods. If it is not necessary to double the number of sections conveyed within a given period, one of the actuating blocks together with the associated elevating rods and the mechanism for forwardly and backwardly moving the elevating rods can be eliminated.

According to the present invention, the sections can be fed without tilting from the collator to the book production line of the book binding machine. And the sections can be effectively fed to the book binding machine. In addition, there is no need of a mechanism for adjusting the level of the sections conveyed to the section delivery station. As a result, a compact book binding machine can be provided.

We claim:

1. A section feeder for a book binding machine provided with a book production line on which a number of clamps are continuously moved, said section feeder being adapted for successively receiving sections from a collator at a section supply station positioned below said book production line and conveying said sections from said supply station to a section delivery station positioned downstream from said section supply station on said book production line, and supplying said sections to the clamps having arrived at said section delivery station, said section feeder comprising:

a pair of guide plates attached substantially perpendicular to a base and arranged in parallel with each other at a spacing corresponding to the thickness of the sections in order to form a section conveying path within said spacing, said section conveying path extending from said section supply station to said section delivery station;

a plurality of parallel guide slits formed on at least one of said guide plates, said plurality of parallel guide slits slantingly extending from said section supply station to said section delivery station, a lower end of each of said guide slits being at the same level or a level lower than said section supply station and an upper end of each of said guide slits being at the same level or a level higher than said section delivery station;

an elevating rod horizontally extending from an area outside of said at least one of said guide plates into said section conveying path through each of said plurality of guide slits and being guided for upward and downward movement along respective guide slits; and drive means for reciprocating said elevating rods all at once along said guide slits in such a manner that said sections are successively lifted without tilting by a flat section support surface formed on said elevating rods from said section supply station to said section delivery station.

2. A section feeder according to claim 1, further comprising a plurality of receiving shafts horizontally extending between said pair of guide plates, said receiving shafts being horizontally spaced in order to form said section supply station thereon.

3. A section feeder according to claim 1 or claim 2, wherein said drive means for reciprocating said elevating rods all at once comprises an actuating block arranged outside said at least one of said guide plates for upward and downward movement in a direction parallel with said guide slits and wherein said elevating rods are attached to said actuating block at one end thereof and horizontally extend from said actuating block toward said section conveying path.

4. A section feeder according to claim 3 further comprising means for controlling an upper limit of movement of said elevating rods within said guide slits in order to adjust a level of said section delivery station.

5. A section feeder for a book binding machine provided with a book production line on which a number of clamps are continuously moved, said section feeder being adapted for successively receiving sections from a collator at a section supply station positioned below said book production line and conveying said sections from said section supply station to a section delivery station positioned downstream from said section supply station on said book production line, and supplying said sections to the clamps having arrived at said section delivery station, said section feeder comprising:

a pair of guide plates attached substantially perpendicular to a base and arranged in parallel with each other at a spacing corresponding to the thickness of the sections so that a section conveying path is formed within said spacing, said section conveying path extending from said section supply station to said section delivery station;

a plurality of parallel guide slits formed on each of said guide plates, said plurality of parallel guide slits slantingly extending from said section supply station to said section delivery station, a lower end of each of said guide slits being at the same level or a level lower than said section supply station and an upper end of each of said guide slits being at the same level or a level higher than said section delivery station;

an elevating rod horizontally extending from an area outside of each said guide plate into said section conveying path through each of said guide slits, said elevating rods being guided for upward and downward movement along respective guide slits as well as forward and backward movement along their axes;

drive means for moving said elevating rods associated with each respective guide plate all at once in such a manner that said elevating rods reciprocate along said guide slits and enter into said section conveying path upon reaching said section supply station and retreat from said section conveying path upon reaching said section delivery station, and alternatively moving said elevating rods associated with each respective guide plate upwardly and downwardly between said supply and delivery stations, whereby said sections are successively lifted without tilting by a flat section support surface formed on said elevating rods from said section supply station to said section delivery station.

6. A section feeder according to claim 5, further comprising a plurality of receiving shafts horizontally extending between said pair of guide plates, said receiving shafts being horizontally spaced in order to form said section supply station thereon.

7. A section feeder according to claim 5 to claim 6, wherein said drive means for reciprocating said elevating rods comprises an actuating block arranged outside each said guide plate for upward and downward movement in a direction parallel with said guide slits as well as forward and backward movement with respect to each said guide plate and wherein said elevating rods are attached to their respective actuating block at one ends thereof and horizontally extend from their respective actuating block to said section conveying path.

8. A section feeder according to claim 7, further comprising means for controlling an upper limit of movement of said elevating rods within said guide slits in order to adjust a level of said section delivery station.

* * * * *